United States Patent
Zingler et al.

(10) Patent No.: US 10,098,178 B2
(45) Date of Patent: Oct. 9, 2018

(54) COMMUNICATION BETWEEN NETWORK NODES OF A MOBILE COMMUNICATION NETWORK USING A COMMUNICATION INTERFACE

(71) Applicant: Deutsche Telekom AG, Bonn (DE)

(72) Inventors: Olaf Zingler, Bonn (DE); Frank Lehser, Bonn (DE); Andreas Neubacher, Korneuburg (AT)

(73) Assignee: DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 15/327,384

(22) PCT Filed: Jul. 13, 2015

(86) PCT No.: PCT/EP2015/065938
§ 371 (c)(1),
(2) Date: Jan. 19, 2017

(87) PCT Pub. No.: WO2016/012291
PCT Pub. Date: Jan. 28, 2016

(65) Prior Publication Data
US 2017/0181221 A1    Jun. 22, 2017

(30) Foreign Application Priority Data
Jul. 21, 2014    (EP) .................................... 14177852

(51) Int. Cl.
*H04W 36/00* (2009.01)
*H04W 76/30* (2018.01)
(Continued)

(52) U.S. Cl.
CPC ....... *H04W 76/34* (2018.02); *H04L 29/08306* (2013.01); *H04W 24/02* (2013.01);
(Continued)

(58) Field of Classification Search
CPC ............. H04W 24/02; H04W 36/0005; H04W 72/0426; H04W 76/06; H04W 76/064;
(Continued)

(56) References Cited

U.S. PATENT DOCUMENTS
2010/0008293 A1    1/2010 Gupta et al.

FOREIGN PATENT DOCUMENTS
EP    2237606 A2    10/2010

OTHER PUBLICATIONS
Motorola: "X2 shutdown", 3GPP Draft; R3-081416, $3^{RD}$ Generation Partnership Project (3GPP), Mobile Competence Centre; 650, Route Des Lucioles; F-06921 Sophia-Antipolis Cedex; France, vo. RAN WG3, No. Kansas City, USA; Apr. 30, 2008, Apr. 30, 2008 (Apr. 30, 2008), XP050164588, sections 1 and 2.
(Continued)

*Primary Examiner* — Philip Sobutka
(74) *Attorney, Agent, or Firm* — Leydidg, Voit & Mayer, Ltd.

(57) ABSTRACT

A method for improved communication between network nodes of a mobile communication network includes: establishing a communication interface between first and second base station entities by generating a first instance of the communication interface at the first base station entity and generating a second instance of the communication interface at the second base station; transmitting, from a removal initiating base station entity, a first removal message to a removal responding base station entity, wherein the removal initiating base station entity is one of the first and second base station entities and the removal responding base station entity is the other of the first and second base station entities; receiving, at the removal initiating base station entity, a second removal message from the removal responding base station entity; and disabling the communication interface,
(Continued)

wherein disabling the communication interface comprises removing the first and second instances of the communication interface.

12 Claims, 1 Drawing Sheet

(51) Int. Cl.
   H04W 76/34    (2018.01)
   H04W 76/06    (2009.01)
   H04W 92/20    (2009.01)
   H04W 24/02    (2009.01)
   H04W 72/04    (2009.01)
   H04W 84/18    (2009.01)
   H04L 29/08    (2006.01)
   H04W 76/02    (2009.01)
   H04W 76/14    (2018.01)

(52) U.S. Cl.
   CPC ... *H04W 36/0005* (2013.01); *H04W 72/0426* (2013.01); *H04W 76/023* (2013.01); *H04W 76/064* (2013.01); *H04W 76/14* (2018.02); *H04W 84/18* (2013.01); *H04W 92/20* (2013.01)

(58) Field of Classification Search
   CPC ............... H04W 76/066; H04W 92/20; H04W 36/0061; H04W 36/08
   USPC ................................. 455/436, 442, 524, 525
   See application file for complete search history.

(56) References Cited

OTHER PUBLICATIONS

Dtag: "Correction X2 interface maintenance procedures", 3GPP Draft; R3-142412_Correction X2 Interface Maintenance Procedures, 3$^{RD}$ Generation Partnership Project (3GPP), Mobile Competence Centre; 650, Route Des Lucioles; F-06921 Sophia-Antipolis Cedex; F, vol. RAN WG3, No. Shanghai. P. R. China; Oct. 6-10, 2014 Sep. 26, 2014 (Sep. 26, 2014), XP050870842.

111: first base station entity

112: second base station entity

301: first removal message

302: second removal message

111: first base station entity

112: second base station entity

301: first removal message

302: second removal message

303: third removal message

COMMUNICATION BETWEEN NETWORK NODES OF A MOBILE COMMUNICATION NETWORK USING A COMMUNICATION INTERFACE

CROSS-REFERENCE TO RELATED APPLICATIONS

This application is a U.S. National Phase application under 35 U.S.C. § 371 of International Application No. PCT/EP2015/065938, filed on Jul. 13, 2015, and claims benefit to European Patent Application No. EP 14177852.2, filed on Jul. 21, 2014. The International Application was published in English on Jan. 28, 2016 as WO 2016/012291 A1 under PCT Article 21(2).

FIELD

The present invention relates a method for improved communication between network nodes of a mobile communication network comprising at least a first base station entity, a second base station entity, wherein the base station entities are enabled to be able to communicate directly with each other using a communication interface between two base station entities, respectively, of the plurality of base station entities.

Furthermore, the present invention relates to a mobile communication network for improved communication between network nodes of the mobile communication network, the mobile communication network comprising at least a first base station entity, a second base station entity, wherein the base station entities are enabled to be able to communicate directly with each other using a communication interface between two base station entities, respectively, of the plurality of base station entities.

Additionally, the present invention relates to a program and a computer program product.

BACKGROUND

The exchange of packetized information in wireless communication systems (or mobile communication networks) has already grown dramatically and probably will also grow in the future due to the rapid adoption of data services in mobile communication networks. Compared to voice services, data requires significantly more traffic and, hence, a much lower cost per bit is needed. A considerable effort has therefore been put in the development of standards for the LTE RAN (Long Term Evolution Radio Access Network) and EPC (Evolved Packet Core), which address these evolving needs. Lower cost per bit can be achieved by using IP protocols, as due to the success of the Internet, the cost of Ethernet packet-based transport networks have fallen.

The X2 communication interface is a type of communication interface between base station entities of a mobile communication network, especially a mobile communication network according to or using the Long Term Evolution (LTE) radio access technology. Typically, the X2 communication interface connects neighboring base station entities, typically enhanced NodeBs (or eNodeBs) in a peer to peer fashion to assist handover and provide a means for rapid coordination of radio resources. In detail, this X2 communication interface can be distinguished between a user and a control plane.

Within the context of Self Organizing Networks (SON), in order to set up and maintain the X2 communication interface, there exist a couple of procedures and functions at the X2 communication interface. These procedures and functions are described in group 3GPP TS 36.423 of the standardization documents. An example of such procedures and functions is the setup of the X2 communication interface. However, the setup procedure presently works well only until a certain number of X2 communication interfaces of a specific eNodeB (or base station entity) is reached.

SUMMARY

In an exemplary embodiment, the present invention provides a method for improved communication between network nodes of a mobile communication network. The mobile communication network comprises an access network and a core network. The access network comprises a plurality of base station entities, the plurality of base station entities comprising a first base station entity, a second base station entity, and further base station entities. The method includes: establishing a communication interface between the first and second base station entities, wherein the establishing the communication interface comprises generating a first instance of the communication interface at the first base station entity and generating a second instance of the communication interface at the second base station; transmitting, from a removal initiating base station entity, a first removal message to a removal responding base station entity, wherein the removal initiating base station entity is one of the first and second base station entities and the removal responding base station entity is the other of the first and second base station entities; receiving, at the removal initiating base station entity, a second removal message from the removal responding base station entity; and disabling the communication interface, wherein the disabling the communication interface comprises removing the first and second instances of the communication interface.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
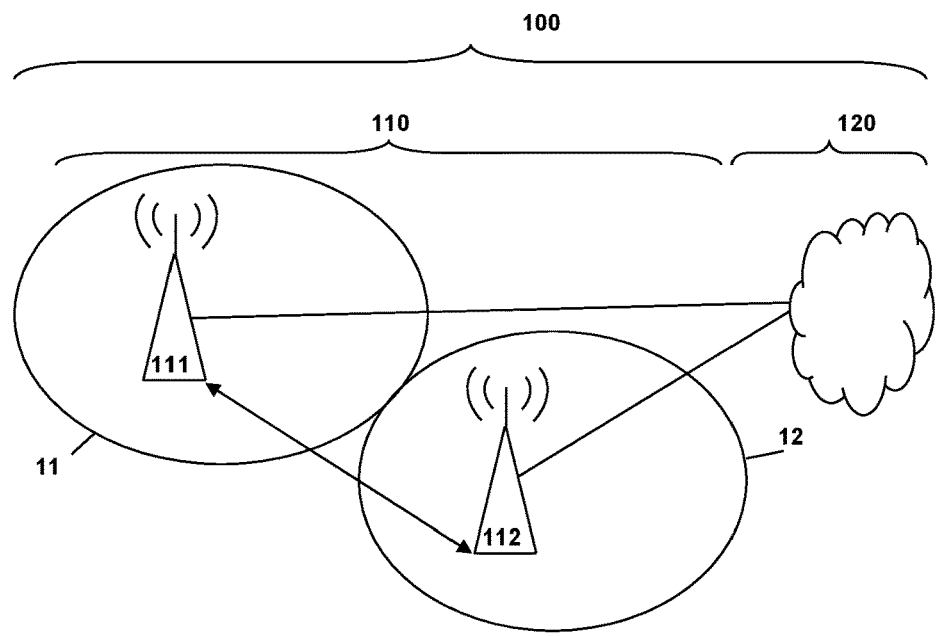
FIG. 1 schematically illustrates a mobile communication network with a first base station entity, a second base station entity, a core network, and an access network.

Exemplary embodiments of the present invention provide a technically simple, effective and cost effective solution for improved communication between the network nodes of a mobile communication network, especially between base station entities using the X2 communication interface. Exemplary embodiments of the present invention further provide a corresponding mobile communication network.

In an exemplary embodiment, the present invention provides a method for improved communication between network nodes of a mobile communication network, wherein the mobile communication network comprises an access network and a core network, wherein the access network comprises a plurality of base station entities, the plurality of base station entities comprising at least a first base station entity, a second base station entity, and further base station entities, wherein the base station entities of the plurality of base station entities are enabled to be able to communicate directly with each other using a communication interface between two base station entities, respectively, of the plurality of base station entities, wherein in order to establish the communication interface between the first and second base station entities, a first instance of the communication interface is generated at the first base station entity and a second instance of the communication interface is generated at the second base station entity, wherein the method comprises the following steps:
  in a first step, the first and second instances of the communication interface are generated and the communication interface is established between the first and second base station entities,
  in a second step, subsequent to the first step, the first and second instances of the communication interface are removed and the communication interface between the first and second base station entities is disabled in case that
    at least a first removal message is transmitted from a removal initiating base station entity among the first and second base station entities to a removal responding base station entity among the first and second base station entities and
    at least a second removal message is transmitted from the removal responding base station entity to the removal initiating base station entity,
wherein either the first base station entity is the removal initiating base station entity and the second base station entity is the removal responding base station entity, or the first base station entity is the removal responding base station entity and the second base station entity is the removal initiating base station entity.

It is thereby advantageously possible according to the present invention that the removal of a direct communication interface—especially an X2 communication interface—between two base station entities, especially eNodeB entities, is performed involving both base station entities concerned.

According to the present invention, the term "communication interface" or "direct communication interface" between two base station entities relates especially to the X2 communication interface between two eNodeBs—especially two neighboring eNodeBs or eNodeBs that are located in the vicinity to each other. The direct communication interface between two base station entities according to the present invention is preferably a direct logical communication interface, i.e. the connection between the connected eNodeBs corresponding to the communication interface is a logical connection.

According to a preferred embodiment of the present invention, the first and second instances of the communication interface are removed and the communication interface between the first and second base station entities is disabled in a coordinated manner.

Thereby, it is meant that the removal of a direct communication interface between two base station entities is performed involving both base station entities concerned, i.e. is performed in a consensual manner. It is thereby advantageously possible that reasons against the removal of the communication interface, such reasons existing in only one of the base station entities involved, can be taken into consideration for the decision whether to remove the communication interface or not.

In practice, the conventionally known setup procedure relating to the X2 communication interface (i.e. the communication interface) typically works until the maximum amount of supported X2 interfaces (or of instances of such a communication interface) is reached at an eNodeB (i.e. a base station entity). In case that a further communication interface (relating to a specific base station entity or eNodeB)—i.e. a further instance of such a communication interface—is requested (typically by another (neighboring) base station entity), one of the instances of the communication interface of that base station entity (or eNodeB) needs to be removed. According to the present invention, this removal is performed in coordination with the other concerned eNodeB (or base station entity) that acts as the communication partner of the communication interface (or X2 interface relation) to be removed. Presently, as no coordinated removal of the communication interface (or X2 interface) between two eNodeBs (or base station entities) is known, undefined situations can occur where the behaviour of the other peer eNodeB base station entity is not exactly specified, e.g. due to an attempted removal of an instance of the communication interface at one of the connected base station entities without a removal of the corresponding other instance of that same communication interface at the other of the connected base station entities.

According to the present invention, the situation is referred where a direct (logical) communication interface between two base station entities exists, i.e. between a first base station entity and a second base station entity. The two base station entities are enabled to be able to communicate directly with each other using the communication interface (i.e. especially the X2 communication interface) between these two base station entities. The communication interface between the first and second base station entities is actually established by generating a first instance of the communication interface at the first base station entity and by generating a second instance of the communication interface at the second base station entity.

The existence of the direct (logical) communication interface between the first and second base station entities means that the premise according to the present invention is that in a first step, the first and second instances of the communication interface are generated and the communication interface is established between the first and second base station entities.

In a second step, subsequent to the first step, a situation might occur where—for one reason or another—the communication interface is either not required by one of the first and second base station entities or it is required that the communication interface be removed. According to the present invention, in such a situation, the first and second instances of the communication interface are removed and the communication interface between the first and second base station entities is disabled according to a protocol that assures coordination of the removal within both the first and the second base station entity. In the context of the present invention, it is assumed that—among the first and second base station entities—there is always one base station entity that requests or initiates the removal of the communication interface and the other responds to that request or initiation. The base station entity requesting the removal is, in the context of the present invention, also called the removal initiating base station entity, and the other base station entity is, in the context of the present invention, also called the removal responding base station entity. The protocol that assures coordination of the removal within both the first and the second base station entities requires that at least a first removal message is transmitted from the removal initiating base station entity to the removal responding base station entity and at least a second removal message is transmitted from the removal responding base station entity to the removal initiating base station entity.

According to a preferred embodiment of the present invention, a communication protocol corresponds to the communication interface, wherein the base station entities of the plurality of base station entities are enabled to communicate with each other according to the communication protocol in case that a communication interface between two base station entities, respectively, of the plurality of base station entities is established.

Thereby, it is advantageously possible that the communication protocol is used for the communication between the first and second base station entities using the communication interface.

According to a further preferred embodiment of the present invention, the first and/or second instances of the communication interface are removed only in case that the second removal message is received by the removal initiating base station entity among the first and second base station entities within a predetermined removal time interval.

Thereby, it is advantageously possible that a removal request (or first removal message) to remove the communication interface between two base station entities, wherein the removal request leads to an error situation (e.g. the removal request (or the first removal message) is not received by the removal responding base station entity or the removal request is not properly handled within the removal responding base station entity), is not followed by a removal attempt at the removal initiating base station entity.

Furthermore, according to an embodiment of the present invention, it is preferred that removal of the first and second instances of the communication interface is prevented in case that the second removal message comprises a removal rejection information, wherein the removal rejection information especially indicates at least one out of the following:
- an important mobility relation between the first and second base station entities,
- an important exchange of load information between the first and second base station entities,
- an important exchange of available (free) resources between the first and second base station entities,
- an important exchange of messages indicating failures between the first and second base station entities,
- an important exchange of interference load information between the first and second base station entities,
- an important exchange of energy saving information between the first and second base station entities,
- the communication interface between the first and second base station entities is regarded as being essential to the removal responding base station entity.

Thereby, it is advantageously possible to easily and effectively transmit the information to the removal initiating base station entity that there exists one or a plurality of reasons against the removal of the first and second instances of the communication interface.

According to a further preferred embodiment of the present invention, the second removal message comprises an indication related to a first waiting time interval, wherein removal of the first and second instances of the communication interface is performed after the first waiting time interval is expired.

Thereby, it is advantageously possible that the removal responding base station entity expresses its consent to the removal of the first and second instances of the communication interface but subjecting this consent to the condition that the first waiting time interval needs to be expired first.

According to the present invention, it is furthermore preferred that the second removal message comprises an indication related to a second waiting time interval, wherein a repetition of the first removal message is suppressed towards removal responding base station entity.

Thereby, it is advantageously possible that the removal responding base station entity expresses its opposition to the removal of the first and second instances of the communication interface at the point in time of the removal request (or first removal message) and additionally expressing its opposition to additional removal requests (or additional first removal messages) from the removal initiating base station entity during the second waiting time interval.

Additionally, it is preferred according to the present invention that removal of the first and second instances of the communication interface and disabling of the communication interface between the first and second base station entities requires—besides the at least first and second removal messages—at least a third removal message, the third removal message
- being transmitted from the removal initiating base station entity to the removal responding base station entity, and
- triggering the removal of the first and second instances of the communication interface.

Thereby, it is advantageously possible that it is assured that the removal responding base station entity knows that the second removal message has actually been transmitted to the removal initiating base station entity such that a proper removal operation can be assured.

Furthermore, it is preferred according to the present invention that the first and second instances of the communication interface are generated and the communication interface is established between the first and second base station entities through transmitting
- at least a first setup message from a setup initiating base station entity among the first and second base station entities and
- at least a second setup message from a setup responding base station entity among the first and second base station entities, wherein either the first base station entity is the setup initiating base station entity and the second base station entity is the setup responding base station entity, or the first base station entity is the setup responding base station entity and the second base station entity is the setup initiating base station entity.

Thereby, it is advantageously possible to establish a communication interface between the first and second base station entities easily and effectively, independent from which one of the first base station entity and the second base station entity is initiating (or responding to) the setup of the communication interface and which one is initiating (responding to) the removal of the communication interface.

Additionally, it is preferred according to the present invention that the second removal message comprises an indication related to a third waiting time interval, wherein an establishment of the communication interface between the first and second base station entities is suppressed during the third waiting time interval.

Thereby, it is advantageously possible that the removal responding base station entity not only expresses its consent to the removal of the first and second instances of the communication interface but also indicates that no new communication interface is established prior to the expiry of the third waiting time interval.

Furthermore, the present invention relates to a mobile communication network for improved communication between network nodes of the mobile communication network, wherein the mobile communication network comprises an access network and a core network, wherein the access network comprises a plurality of base station entities, the plurality of base station entities comprising at least a first base station entity, a second base station entity, and further base station entities, wherein the base station entities of the plurality of base station entities are enabled to be able to communicate directly with each other using a communication interface between two base station entities, respectively, of the plurality of base station entities, wherein the mobile communication network is configured such that in order to establish the communication interface between the first and second base station entities, a first instance of the communication interface is generated at the first base station entity and a second instance of the communication interface is generated at the second base station entity, wherein the mobile communication network is configured such that:
  the first and second instances of the communication interface are generated and the communication interface is established between the first and second base station entities,
  the first and second instances of the communication interface are removed and the communication interface between the first and second base station entities is disabled through transmitting
    at least a first removal message from a removal initiating base station entity among the first and second base station entities and
    at least a second removal message from a removal responding base station entity among the first and second base station entities,
wherein either the first base station entity is the removal initiating base station entity and the second base station entity is the removal responding base station entity, or the first base station entity is the removal responding base station entity and the second base station entity is the removal initiating base station entity.

Additionally, it is preferred according to the present invention—especially with respect to the mobile communication network—that the mobile communication network is configured such that the first and second instances of the communication interface are generated and the communication interface is established between the first and second base station entities through transmitting
  at least a first setup message from a setup initiating base station entity among the first and second base station entities and
  at least a second setup message from a setup responding base station entity among the first and second base station entities,
wherein either the first base station entity is the setup initiating base station entity and the second base station entity is the setup responding base station entity, or the first base station entity is the setup responding base station entity and the second base station entity is the setup initiating base station entity.

It is furthermore preferred according to the present invention—also with respect to the mobile communication network—that removal of the first and second instances of the communication interface is prevented in case that the second removal message comprises a removal rejection information, wherein the removal rejection information especially indicates at least one out of the following:
  an important mobility relation between the first and second base station entities,
  an important exchange of load information between the first and second base station entities,
  an important exchange of available (free) resources between the first and second base station entities,
  an important exchange of messages indicating failures between the first and second base station entities,
  an important exchange of interference load information between the first and second base station entities,
  an important exchange of energy saving information between the first and second base station entities,
  the communication interface between the first and second base station entities is regarded as being essential to the removal responding base station entity.

Additionally, the present invention relates to a program comprising a computer readable program code which, when executed on a computer and/or on a base station entity and/or on a network component of a mobile communication network or in part on a base station entity and in part on another base station entity, causes the computer and/or the base station entity and/or the network component of the mobile communication network to perform the inventive method.

Still additionally, the present invention relates to computer program product for improved communication between network nodes of a mobile communication network, the computer program product comprising a computer program stored on a storage medium, the computer program comprising program code which, when executed on a computer and/or on a base station entity and/or on a network component of a mobile communication network or in part on a base station entity and in part on another base station entity, causes the computer and/or the base station entity and/or the network component of the mobile communication network to perform the inventive method.

These and other characteristics, features and advantages of the present invention will become apparent from the following detailed description, taken in conjunction with the accompanying drawings, which illustrate, by way of example, the principles of the invention. The description is given for the sake of example only, without limiting the scope of the invention. The reference figures quoted below refer to the attached drawings.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

In FIG. 1, a mobile communication network 100, especially a public land mobile network 100, is schematically shown, the mobile communication network 100 comprising an access network 110 and a core network 120. The core network 120 is only schematically shown by means of a cloud representation. The mobile communication network 100 is preferably a cellular telecommunications network 100 comprising typically a plurality of network cells, two of which are represented in FIG. 1 by means of a solid line and reference signs 11 (first radio cell) and 12 (second radio cell). In the telecommunications network 100, typically a plurality of user equipments are camping on the telecommunications network 100 within the network cells 11, 12, i.e. the user equipments are connected or are camping on a first base station entity 111, the first base station entity 111 serving the first radio cell 11, or on a second base transceiver station 112, the second base transceiver station 112 serving the second radio cell 12. The first and second base transceiver stations 111, 112 are typically base transceiver stations, e.g. an eNodeB in case of LTE.

According to the present invention, the first and second base station entities 111, 112 are connected by a communication interface (represented by a double-arrow between the first and second base station entities 111, 112 in FIG. 1), especially a X2 interface between eNodeBs.

The communication interface between the first and second base station entities 111, 112 relates to a first instance of the communication interface at the first base station entity 111 and to a second instance of the communication interface at the second base station entity 112. According to the present invention, this communication interface can be removed in a coordinated manner through exchanging first and second removal messages (cf. FIG. 2), or first, second, and third removal messages (cf. FIG. 3) between the first and second base station entities 111, 112.

Figure 2:
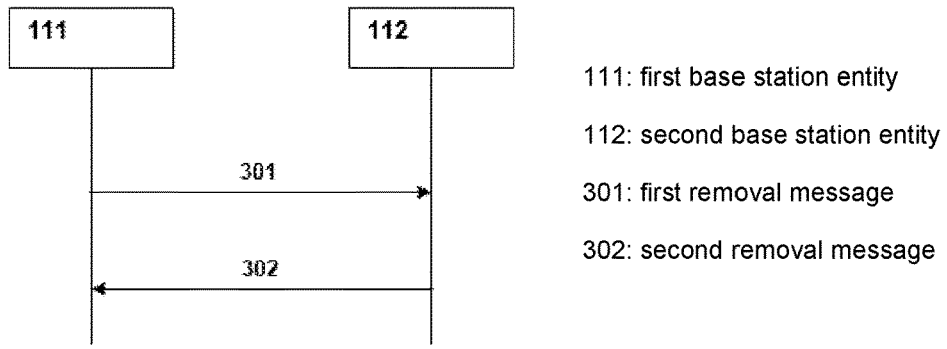
FIGS. 2 and 3 schematically illustrate communication diagrams according to the present invention between the first and second base station entities in case of a coordinated removal of a direct communication interface between the first and second base station entities.
Figure 3:
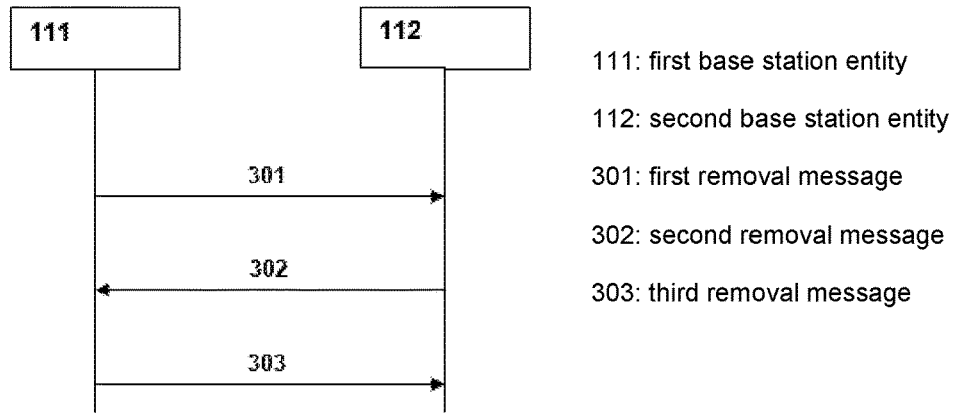

In the examples represented in FIGS. 2 and 3, the first base station entity 111 corresponds to the removal initiating base station entity and the second base station entity 112 corresponds to the removal responding base station entity.

FIG. 2 represents the situation where a first and a second removal message are exchanged. In order to remove the communication interface in a coordinated manner, the first base station entity 111—according to its role as removal initiating base station entity—sends the first removal message 301 to the second base station entity 112—according to its role as removal initiating base station entity. Additionally, the second base station entity 112 sends the second removal message 302 to the first base station entity 111. After reception of the second removal message 302 at the first base station entity (i.e. at the removal initiating base station entity) the communication interface is removed or the removal of the communication interface is initiated both at the first base station entity 111 and at the second base station entity 112.

FIG. 3 represents the situation where a first, a second and a third removal message is exchanged. In order to remove the communication interface in a coordinated manner, the first base station entity 111—according to its role as removal initiating base station entity—sends the first removal message 301 to the second base station entity 112—according to its role as removal initiating base station entity. Additionally, the second base station entity 112 sends the second removal message 302 to the first base station entity 111. Additionally, the first base station entity 111 sends the third removal message 303 to the second base station entity 112. After reception of the third removal message 303 at the second base station entity (i.e. at the removal responding base station entity) the communication interface is removed or the removal of the communication interface is initiated both at the first base station entity 111 and at the second base station entity 112.

Exemplary embodiments of the present invention handle situations between base station entities where communication interfaces need to be removed, especially the X2 interface, at both peers in a coordinated manner. Because of the fact that the amount of X2 interfaces (i.e. the number of instances of communication interfaces (i.e. individual communication interfaces between specific base station entities), are not unlimited and different limitations might exist, like 64 or 128 or 256 different instances of X2 interfaces being supported, the demand of a coordinated removal of communication interfaces, especially X2 interfaces, is given. Also in networks with eNodeBs with the same system limitations, uneven utilization of X2 interfaces can happen. For example in an ongoing network deployment or simply due to inhomogeneous radio network structures a first eNodeB (eNodeB A) might reach this system limitation earlier and if another eNodeB (eNodeB B) is deployed in the coverage area of the first eNodeB (eNodeB A) and requires a X2 communication interface to the first eNodeB (i.e. this eNodeB A), such a communication interface (or connection) cannot be setup symmetrically (because of no free space of X2 in eNodeB A). Typically, it might be possible to remove, in the first eNodeB (i.e. eNodeB A) instances of X2 interfaces that are less used or not used (e.g. instances of the communication interface towards a further eNodeB (eNodeB C)) and thereby to free space (especially memory space) for new instances of communication interfaces with other eNodeBs in the direct surrounding of eNodeB A. However, the other eNodeB (eNodeB C) might be unable to correctly remove the communication interface or might try to repeatedly re-setup the communication interface.

According to the present invention, a bi-directional removal of the communication interface between the first and second base station entities (i.e. the direct interfaces between peers) is provided.

If a situation is triggered to remove an existing X2 communication interface, e.g. based on usage within a defined time frame for the purpose of mobility (like analysis of in- and outgoing handover between both eNodeBs which are handled by this interface) or if a certain amount of X2 communication interfaces is reached, a X2 removal request (first removal message 301) is sent from eNodeB A (or first base station entity 111) to eNodeB C (or second base station entity 112). In case there is no valid reason in eNodeB C (or second base station entity 112) to keep this X2 communication interface to eNodeB A (or first base station entity 111) alive, the request (first removal message 301) is confirmed by eNodeB C (or second base station entity 112) and immediately after (or within a defined time frame) the managed objects of the instances (within the first and second base station entities 111, 112) of this X2 communication interface are removed. If eNodeB A receives the removal confirmation (i.e. the second removal message 302), also here the X2 related managed objects (as e.g. ACL settings (ACL: Access control list means firewall settings for the related X2)) shall be removed.

This procedure may be controlled by a timer in the first base station entity 111, e.g. to request after this timer is expired the removal request again, if the trigger condition is still valid.

To avoid unnecessary repetitions of the removal requests from eNodeB A to C, it is possible and preferred according to the present invention that a removal objection information can be transmitted—as part of the second removal message 302—by the second base station entity 112.

Possible causes of rejection include:
- an important mobility relation in target eNodeB C (i.e. between eNodeB A and eNodeB C), e.g. one of the most used X2 relations in eNodeB C for successful handover and/or exchange of load information related to SONs function (Self Organizing Networks) load balancing functions as specified in 3GPP
- white listed X2 relation in the target eNodeB C, e.g. X2 removal is forbidden by the mobile network operator,
- source eNodeB A is an important interferer of eNodeB C and therefore the exchange of interference load information as specified from 3GPP is important.

As an alternative to immediate removal of the instance of the communication interface at the removal responding base station entity after reception of the first removal message, in an exemplary embodiment according to the present invention that (wherein again, the trigger conditions to remove a defined X2 interface need to be fulfilled):
- the first base station entity 111 (eNodeB A) sends a X2 removal request (first removal message 301) to the second base station entity 112 (eNodeB C);
- the second base station entity 112 (eNodeB C) analyses this request and sends a X2 removal answer (second removal message 302) to the first base station entity 111 (eNodeB A);

Within this answer, the statement is given, whether—from a point of view of the second base station entity 112 (eNodeB C)—the X2 communication interface can also be removed; if not, a cause of rejection is given in the answer to the first base station entity 111 (eNodeB A),
- in case of a received confirmation (second removal message 302) from eNodeB C in eNodeB A, the first base station entity 111 (eNodeB A) sends a X2 removal release/command (third removal message 303) to the second base station entity 112 (eNodeB C) and removes all related managed objects (e.g. ACL settings). If eNodeB C receives the X2 removal release/command (third removal message 303) it removes all related managed objects of this X2 interface.

It is preferred according to the present invention that new information elements are added in 3GPP X2 management signaling messages, such as:
- Appropriate causes to indicate resource limits;
- X2 usage (X2 used for mobility purpose or medium to transfer network information as interference information) as a basis for X2 prioritization (of the kind of, e.g., that exchange of data for mobility purposes is more important than for information transfer);
- X2 priorities as a basis for efficient X2 administration
- Acknowledge message to ensure a controlled X2 administration as e.g. an acknowledgement that the removal is accepted from the partner eNodeB.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for communication between network nodes of a mobile communication network, wherein the mobile communication network comprises an access network and a core network, wherein the access network comprises a plurality of base station entities, the plurality of base station entities comprising a first base station entity, a second base station entity, and further base station entities, wherein the method comprises:
- establishing a communication interface between the first and second base station entities, wherein the establishing the communication interface comprises generating a first instance of the communication interface at the first base station entity and generating a second instance of the communication interface at the second base station;
- transmitting, from a removal initiating base station entity, a first removal message to a removal responding base station entity, wherein the removal initiating base station entity is one of the first and second base station entities and the removal responding base station entity is the other of the first and second base station entities;
- receiving, at the removal initiating base station entity, a second removal message from the removal responding base station entity; and
- disabling the communication interface, wherein the disabling the communication interface comprises removing the first and second instances of the communication interface in a coordinated manner wherein the removal initiating base station entity and the removal responding base station entity consent to removal of the respective instances of the communication interface;
- wherein the removal of the first and second instances of the communication interface is preventable in case that a removal message received at a removal initiating base station entity comprises removal rejection information, wherein the removal rejection information indicates at least one of:
  - an important mobility relation between the first and second base station entities,
  - an important exchange of load information between the first and second base station entities,
  - an important exchange of available resources between the first and second base station entities,
  - an important exchange of messages indicating failures between the first and second base station entities, an important exchange of interference load information between the first and second base station entities, an important exchange of energy saving information between the first and second base station entities, and/or the communication interface between the first and second base station entities is regarded as being essential to the removal responding base station entity.

2. The method according to claim 1, wherein a communication protocol corresponds to the communication interface and the first and second base station entities are configured to communicate with each other according to the communication protocol in case that the communication interface is established.

3. The method according to claim 1, wherein the first and/or second instances of the communication interface are removed in response to the second removal message being received by the removal initiating base station entity within a predetermined removal time interval.

4. The method according to claim 1, wherein the second removal message comprises an indication related to a waiting time interval, wherein the removal of the first and second instances of the communication interface is performed after the first waiting time interval is expired.

5. The method according to claim 1, wherein the second removal message comprises an indication related to a waiting time interval, wherein a repetition of the first removal message is suppressed towards the removal responding base station entity during the waiting time interval.

6. The method according to claim 1, further comprising, prior to the disabling the communication interface:

transmitting, from the removal initiating base station entity, a third removal message to the removal responding base station entity;

wherein the disabling the communication interface and the removal of the first and second instances of the communication interface are triggered by the third removal message.

7. The method according to claim 1, wherein the establishing the communication interface between the first and second base station entities further comprises:

transmitting a first setup message from a setup initiating base station entity to a setup responding base station entity, wherein the setup initiating base station entity is one of the first and second base station entities and the setup responding base station entity is the other of the first and second base station entities; and receiving, at the setup initiating base station entity, a second setup message from the setup responding base station entity.

8. The method according to claim 1, wherein the second removal message comprises an indication related to a waiting time interval, wherein establishment of a communication interface between the first and second base station entities is suppressed during the waiting time interval.

9. A mobile communication network for communication between network nodes of the mobile communication network, wherein the mobile communication network comprises:

an access network; and
a core network;

wherein the access network comprises a plurality of base station entities, the plurality of base station entities comprising at least a first base station entity, a second base station entity, and further base station entities;

wherein the first and second base station entities are configured for:

establishing a communication interface between the first and second base station entities, wherein the establishing the communication interface comprises generating a first instance of the communication interface at the first base station entity and generating a second instance of the communication interface at the second base station;

transmitting, from a removal initiating base station entity, a first removal message to a removal responding base station entity, wherein the removal initiating base station entity is one of the first and second base station entities and the removal responding base station entity is the other of the first and second base station entities;

receiving, at the removal initiating base station entity, a second removal message from the removal responding base station entity; and disabling the communication interface, wherein the disabling the communication interface comprises removing the first and second instances of the communication interface in a coordinated manner wherein the removal initiating base station entity and the removal responding base station entity consent to removal of the respective instances of the communication interface;

wherein the first and second base station entities are configured for preventing removal of the first and second instances of the communication interface in case that a removal message received at a removal initiating base station entity comprises removal rejection information, wherein the removal rejection information indicates at least one of:

an important mobility relation between the first and second base station entities, an important exchange of load information between the first and second base station entities, an important exchange of available resources between the first and second base station entities, an important exchange of messages indicating failures between the first and second base station entities, an important exchange of interference load information between the first and second base station entities, an important exchange of energy saving information between the first and second base station entities, and/or the communication interface between the first and second base station entities is regarded as being essential to the removal responding base station entity.

10. The mobile communication network according to claim 9, wherein establishing the communication interface between the first and second base station entities further comprises:

transmitting a first setup message from a setup initiating base station entity to a setup responding base station entity, wherein the setup initiating base station entity is one of the first and second base station entities and the setup responding base station entity is the other of the first and second base station entities; and receiving, at the setup initiating base station entity, a second setup message from the setup responding base station entity.

11. A non-transitory computer-readable medium having processor-executable instructions stored thereon for communication between network nodes of a mobile communication network, wherein the mobile communication network comprises an access network and a core network, wherein the access network comprises a plurality of base station entities, the plurality of base station entities comprising a first base station entity, a second base station entity, and further base station entities, wherein the processor-executable instructions, when executed, facilitate performance of the following:
- establishing a communication interface between the first and second base station entities, wherein the establishing the communication interface comprises generating a first instance of the communication interface at the first base station entity and generating a second instance of the communication interface at the second base station;
- transmitting, from a removal initiating base station entity, a first removal message to a removal responding base station entity, wherein the removal initiating base station entity is one of the first and second base station entities and the removal responding base station entity is the other of the first and second base station entities;
- receiving, at the removal initiating base station entity, a second removal message from the removal responding base station entity; and
- disabling the communication interface, wherein the disabling the communication interface comprises removing the first and second instances of the communication interface in a coordinated manner wherein the removal initiating base station entity and the removal responding base station entity consent to removal of the respective instances of the communication interface;
- wherein the removal of the first and second instances of the communication interface is preventable in case that a removal message received at a removal initiating base station entity comprises removal rejection information, wherein the removal rejection information indicates at least one of:
  - an important mobility relation between the first and second base station entities,
  - an important exchange of load information between the first and second base station entities,
  - an important exchange of available resources between the first and second base station entities,
  - an important exchange of messages indicating failures between the first and second base station entities,
  - an important exchange of interference load information between the first and second base station entities,
  - an important exchange of energy saving information between the first and second base station entities, and/or
  - the communication interface between the first and second base station entities is regarded as being essential to the removal responding base station entity.

12. A method for communication between network nodes of a mobile communication network, wherein the mobile communication network comprises an access network and a core network, wherein the access network comprises a plurality of base station entities, the plurality of base station entities comprising a first base station entity, a second base station entity, and further base station entities, wherein the method comprises:
- establishing a communication interface between the first and second base station entities, wherein the establishing the communication interface comprises generating a first instance of the communication interface at the first base station entity and generating a second instance of the communication interface at the second base station;
- transmitting, from a removal initiating base station entity, a first removal message to a removal responding base station entity, wherein the removal initiating base station entity is one of the first and second base station entities and the removal responding base station entity is the other of the first and second base station entities;
- receiving, at the removal initiating base station entity, a second removal message from the removal responding base station entity; and
- disabling the communication interface, wherein the disabling the communication interface comprises removing the first and second instances of the communication interface in a coordinated manner wherein the removal initiating base station entity and the removal responding base station entity consent to removal of the respective instances of the communication interface;
- wherein the removal of the first and second instances of the communication interface is preventable in case that a removal message received at a removal initiating base station entity comprises removal rejection information, wherein the removal rejection information indicates at least one of:
  - an important mobility relation between the first and second base station entities,
  - an important exchange of available resources between the first and second base station entities,
  - an important exchange of messages indicating failures between the first and second base station entities,
  - an important exchange of interference load information between the first and second base station entities,
  - an important exchange of energy saving information between the first and second base station entities, and/or
  - the communication interface between the first and second base station entities is regarded as being essential to the removal responding base station entity.

* * * * *